Feb. 22, 1938.  W. F. GROENE  2,109,371
RESILIENT WORK DRIVING MEANS
Filed July 17, 1936
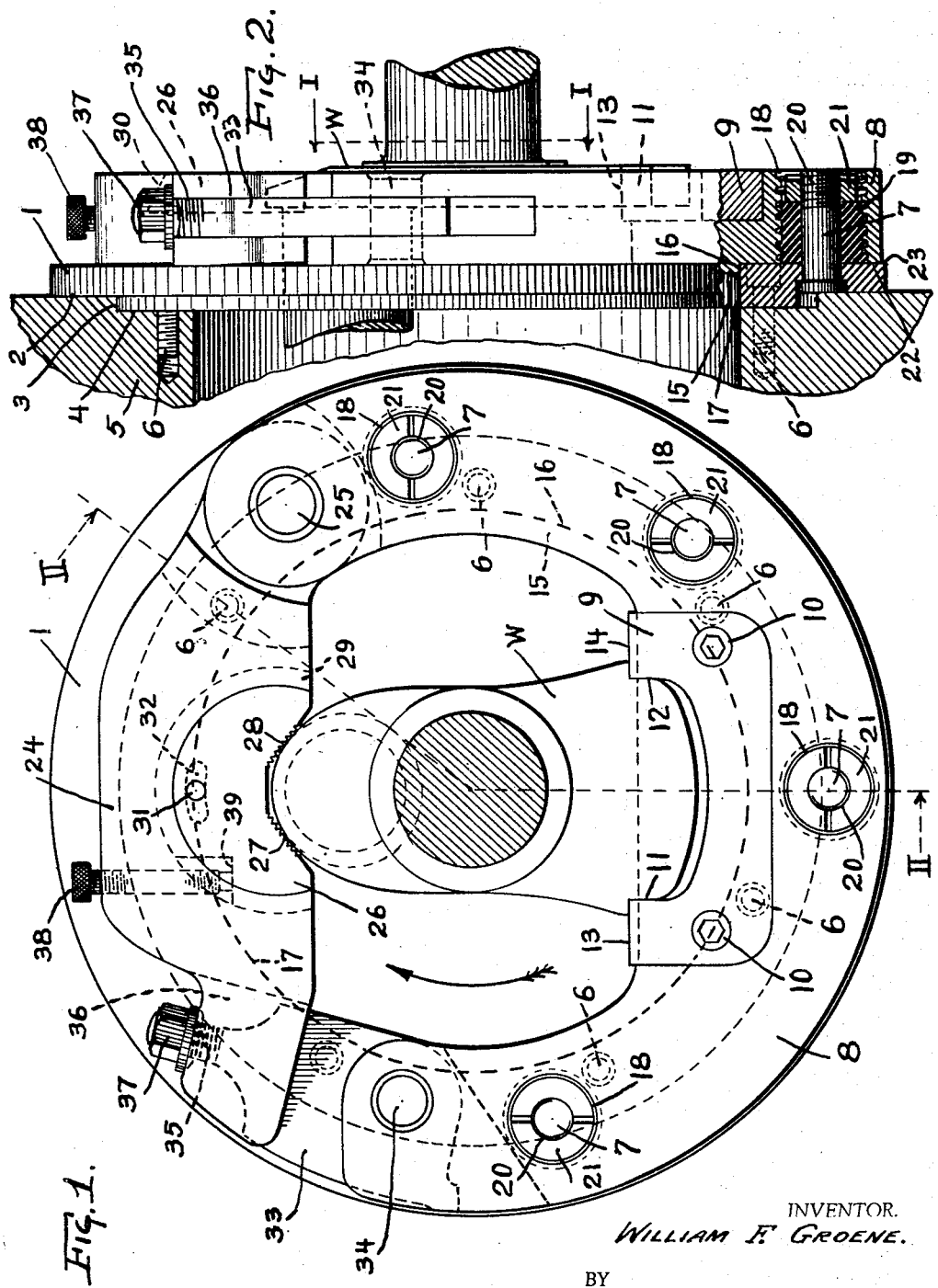
INVENTOR.
WILLIAM F. GROENE.
BY
Allen & Allen
ATTORNEY.

Patented Feb. 22, 1938

2,109,371

UNITED STATES PATENT OFFICE 2,109,371

RESILIENT WORK DRIVING MEANS

William F. Groene, Cincinnati, Ohio, assignor to The R. K. Le Blond Machine Tool Company, Cincinnati, Ohio, a corporation of Delaware Application July 17, 1936, Serial No. 91,165

18 Claims. (Cl. 82—40)

Heretofore it has been the problem in finish turning the surface of a work piece to avoid the effect of chatter and the consequent chatter marks which cause imperfection in the work surface and destroy the accuracy thereof. Chatter is the phenomena of rapid relative vibration between a cutting tool and the work piece. Its causes are not thoroughly understood, but it is produced to a marked degree when the tool is feeding at a comparative fine rate relative to the work or when the tool is allowed to dwell on the work piece for the purpose of properly sizing the surface being machined.

I have discovered that these difficulties may be overcome by providing a resilient driving means for rotating the work piece being machined, the effect of which resilient driving means is to absorb or damp out the relative vibration or chatter ordinarily set up during turning operations.

Another object of my invention is to provide a resilient work driver, which allows restricted circumferential movement of the work piece therein relative to the driving means, i. e. about the axis of turning of the work piece.

Still another object is to provide a chucking device in which a work piece is gripped and held in exact centered position but at the same time is resiliently mounted so as to permit restricted circumferential movement against the force of the driving means.

Another object is the provision of new and useful means for holding and rotating a work piece and having a plurality of resilient work drivers.

Another object is to provide in a chuck a positive locating means for a work piece in combination with an equalizing clamping mechanism.

And a further object is to provide in a chuck a positive locating means for a work piece and an equalizing clamping means for holding the work piece in engagement with the locating means and in which the equalizing action is rendered positive after clamping of the work in the chuck.

Further objects will appear in conjunction with the description which follows. I shall show and describe an operative embodiment of my invention, it being understood that this is exemplary only and not limiting.

Reference is made to the drawing wherein:

Fig. 1 is a face view of a chucking device illustrating the exemplary form of application of my invention.

Fig. 2 is a side view of the chuck partly in section on line II—II of Fig. 1 showing the method of attachment to a lathe spindle or center drive ring gear.

The particular chuck illustrated has the annular mounting ring 1 which is accurately located by the surfaces 2, 3, and 4 either on a lathe spindle or on a center drive ring gear 5 (as illustrated) and is securely held thereon by means of suitable screws 6. Fixed in the mounting ring 1 and projecting substantially parallel with the axis of rotation of the chuck are the driving studs 7.

The locating and driving portion of the chuck comprises the segmental member 8 which has suitable means for engaging a work piece W as for example the locating block 9 fixed to the member 8 by suitable screws 10 and having locating faces 11, 12, 13 and 14 which engage mating, machined, locating surfaces on a work piece W substantially in a manner disclosed and claimed in Patent 2,030,020.

The segmental member 8 has a projecting portion 15, having a cylindrical portion 16 journaled in the bore 17 provided in the annular ring 1, the bore 17 being arranged so as to be concentric with the axis of turning of the lathe. The segmental member 8 is a segment comprising preferably substantially more than a half-circle, so that member 8 and its locating and driving means will be definitely located relative to the axis of turning of the chuck while at the same time allowing circumferential movement of the member 8 about the axis of turning.

In order to provide means for restricting the circumferential movement and resiliently to drive the member 8 for rotating the work piece W, threaded bores 18 are formed in the segmental member 8 which surround the driving studs 7. Fitting snugly in the bores 18 and around the studs 7 are suitable resilient bushings 19 of rubber or other resilient substance. On the threaded end portions 20 of the studs 7 are mounted suitable nuts 21 which may be screwed down axially to compress the resilient bushings 19. This expands them inwardly against the studs 7 and outwardly into the threaded bores 18. The purpose of this is to adjust the proper resiliency in the bushings 19 and to hold the face 22 of the segmental member 8 against the face 23 of the annular ring 1 so as to keep the diameter 16 engaged in the bore 17 at all times.

A clamp 24 is pivotally mounted on the pin 25 fixed in the segmental member 8 and has an equalizing jaw 26 with angularly related serrated portions 27 and 28 adapted to engage portions on a work piece. The jaw 26 has a beveled outer diameter 29 extending somewhat more than a half-circle, which takes bearing in a mating arcuate guide 30 formed in the clamp 24. A pin 31 fixed in the clamp 24 and entering in the arcuate slot 32 prevents the jaw 26 from coming out of the arcuate guide 30 while at the same time permitting the necessary equalizing motion in the jaw 26.

A latch 33, pivotally mounted on a pin 34 fixed in the segmental member 8, has a threaded end portion 35 adapted to be swung into the slot 36 in the outer end of the clamp 24 and a nut 37 which may be tightened down to bring the clamp 24 and the equalizing jaw 26 into firm engagement with the work piece W.

Means are also provided for positively holding the equalizing jaw 26 in equalized position after clamping of the work piece W. If, for example, the chuck is rotating in a clockwise direction as indicated by the arrow of Fig. 1, and the work piece W is being held from rotation due to the cutting tools acting thereon, the work piece W would then exert force against the serrated portion 27 and tend to rotate the jaw 26 clockwise which would allow the work piece W to pivot on the surface 13 and raise from the surface 14 of the locating block 9 so as to destroy the proper centered position of the work piece W. I have overcome this difficulty by providing a thumb screw 38 which is snugly threaded in the cap 24 and which may be screwed down against a suitable abutment area 39 provided on the equalizing jaw 26 after the clamp 24 has been brought into proper engagement with the work piece W by tightening the nut 37.

While I have here illustrated and described one form of my invention it is to be clearly understood that I am not limited to the precise construction or use herein shown, but what I claim as new and desire to secure by Letters Patent is:

1. In a resilient work driver, a rotatable body, means for engaging a work piece, and resilient means for mounting said engaging means on said body so as to permit restricted circumferential relative movement of said engaging means and said body about the axis of rotation of the work driver.

2. In a resilient work driver, a rotatable body, means for gripping a work piece, and resilient means for mounting said gripping means in centered position on said body so as to permit restricted circumferential relative movement of the work piece and said body about the axis of rotation of the body while held in said gripping means.

3. In a rotatable chucking device, having a driving element, means for gripping and holding a work piece in exact centered position, and resilient mounting means for said gripping and holding means connected to said driving element, said mounting means permitting restricted circumferential relative movement of said last mentioned means and said driving element about the axis of rotation of the work piece.

4. In a rotatable chucking device, having a driving element, means for definitely locating and rotating a work piece, means for securing said work piece to said locating and rotating means, and mounting means for said locating, rotating and securing means with reference to said driving element, said mounting means being resilient so that work chucked in said chucking device may have restricted circumferential movement relative to said driving element about its axis of rotation.

5. In a chuck comprising a rotatable chuck body, means for definitely centering and driving a work piece, clamping means to hold said work piece to said centering and driving means, means for positively centering said centering and driving means on said chuck body, and a resilient driving connection between said first mentioned means and said chuck body.

6. In a chuck comprising a rotatable body, means for definitely centering, axially positioning, and driving a work piece, clamping means mounted thereon for positively holding said work piece in proper engagement therewith, means for positively centering said first mentioned means on said chuck body, and a resilient driving connection between said first mentioned means and said chuck body permitting limited circumferential movement of said first mentioned means.

7. In a chuck, means for definitely locating a work piece in exact centered and indexed position in the chuck, equalizing clamping means to hold said work piece in engagement with said locating means, and means for rendering said equalizing clamping means positive after said equalizing clamping means is rendered effective.

8. In a center drive chucking device, a center drive ring gear, means for rotating said ring gear, a chuck mounted on an end of said ring gear and comprising means for locating a work piece in definite centered and axial position relative to the axis of rotation of said ring gear and for driving said work piece, and equalizing clamping mechanism to hold said work piece in proper engagement with said locating means.

9. In a center drive chucking device, a center drive ring gear, means for rotating said ring gear, a chuck mounted on an end of said ring gear and comprising means for locating a work piece in definite centered and axial position relative to the axis of rotation of said ring gear and for driving said work piece, equalizing clamping mechanism to hold said work piece in proper engagement with said locating means, and means for rendering said equalizing clamping mechanism positive after said equalizing means is rendered effective.

10. In a center drive chucking device, a center drive ring gear, means for rotating said ring gear, resilient work drivers mounted on each end of said ring gear comprising members mounted for limited circumferential movement relative to said ring gear about the axis of rotation of said ring gear and work engaging means connected to said members.

11. In a center drive chucking device, a center drive ring gear, means for rotating said ring gear, chucking devices mounted on each end of said ring gear, said chucking devices comprising members mounted for limited circumferential movement about the axis of rotation of said ring gear, means for definitely locating a work piece in centered and axial position and for driving said work piece, and means to hold said work piece in proper engagement with said locating means, said locating and clamping means being mounted on said members.

12. In a chuck comprising a rotatable chuck body, a segmental member journaled on said chuck body for rotation about the axis of rotation of the chuck, locating and driving means for a work piece fixed on said member, a clamp bar pivotally mounted on one end of said segmental member and adapted to be moved to a position across a portion of the work piece or moved from said position, latch means operatively mounted on the other end of said segmental member and adapted to engage the clamp bar when the clamp bar is across the work piece, said latch means including mechanism to engage the clamp bar so as to draw the clamp bar to the work piece or release it therefrom, and resilient driving connections between said chuck body and said segmental member serving to limit and damp out circumferential movements of said segmental member relative to said chuck body.

13. A chuck as set forth in claim 12 wherein said resilient driving connection also serves as the sole means to position said segmental member axially on said chuck body.

14. In a chuck comprising a rotatable chuck body, means at one side of the axis of rotation of the chuck body for locating a work piece in definite centered, axial, and indexed position relative to the chuck body and to drive said work piece, and means on said chuck body to clamp the work piece to said locating means, comprising a clamp bar having a movable connection to said chuck body at one side of said axis, whereby it may be moved from a position of disengagement to a position across a portion of the work piece, an equalizing jaw pivotally mounted in said clamp bar and adapted to engage said work piece at a plurality of points when said clamp bar is moved to a position across the portion of the work piece, and latch means operatively mounted at the other side of said axis and comprising a device to engage the clamp bar, when the clamp bar is across the work piece, so as to draw the clamp bar to the work piece.

15. In a chuck as set forth in claim 14, means in said clamp bar to prevent further motion of said equalizing jaw after equalization and when said clamp bar is drawn against the work piece so as to provide an additional definite locating and driving means for the work piece in said chuck.

16. In a chatterless lathe, means for holding a work piece in centered position on the lathe spindle, means for rotating said spindle, and a resilient connection between said work piece and said spindle whereby said work piece is maintained indexed relative to said spindle but whereby a slight non-conformity of motion is permitted between said work piece and spindle.

17. In a chuck, means for definitely locating a work piece in exact centered and indexed position in the chuck, and equalizing clamping means to hold said work piece in engagement with said definite locating means.

18. In a chuck, means for definitely locating a work piece in said chuck comprising locating areas in the chuck adapted to engage locating areas on a work piece to be gripped so as to accurately center and drive said work piece in the chuck, and equalizing clamping mechanism to hold said work piece in engagement with said definite locating means.

WILLIAM F. GROENE.